Figure 1:
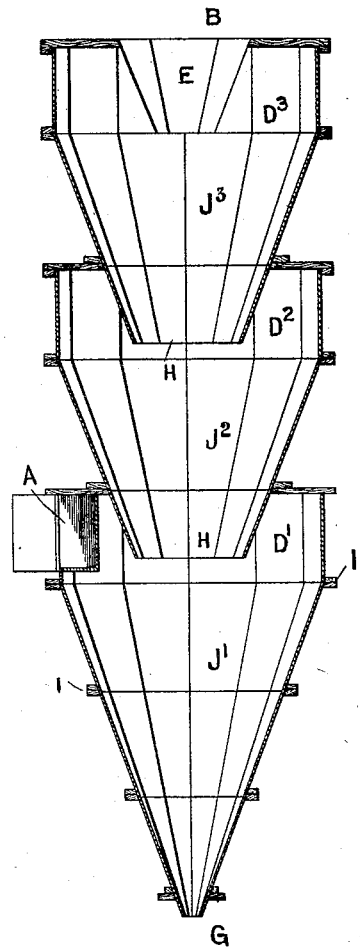

(No Model.)  2 Sheets—Sheet 1.

P. VAN GELDER.
DUST COLLECTOR.

No. 479,231.  Patented July 19, 1892.

Witnesses
James F. Duhamel
Horace A. Dodge.

Pieter Van Gelder,
Inventor
by Dodge Sons,
Atty.

(No Model.) 2 Sheets—Sheet 2.

P. VAN GELDER.
DUST COLLECTOR.

No. 479,231. Patented July 19, 1892.

Witnesses
James F. Duhamel.
Horace A. Dodge.

Inventor
Pieter Van Gelder,
by Dodge Sons, Atty.

UNITED STATES PATENT OFFICE.

PIETER VAN GELDER, OF SOWERBY BRIDGE, ENGLAND.

DUST-COLLECTOR.

SPECIFICATION forming part of Letters Patent No. 479,231, dated July 19, 1892.

Application filed December 19, 1891. Serial No. 415,592. (No model.)

*To all whom it may concern:*

Be it known that I, PIETER VAN GELDER, milling engineer, a subject of the King of Holland, and a resident at Sowerby Bridge, in the county of York, England, have invented certain new and useful Improvements in Dust-Collectors, of which the following is a specification.

This invention has for its objects a process for separating smoke and an apparatus for this purpose and for separating other dust from air on the well-known vortex principle, in which the dusty air enters a more or less conical chamber tangentially, thus forming a whirlwind in miniature, the dust passing out from the hopper at the bottom and the purified air escaping through a central orifice at the top. Vortex machines of this nature have been made circular in cross-section. In the old machines, the circumference being circular, there are no quiet spaces in which the dust can collect and slide down to the bottom, but throughout the machine the dust already settling on the sides is exposed to the whirling air. For these reasons it has been only practicable to separate comparatively coarse dust from air, such fine dust as smoke being quite out of the question. Furthermore, I have found that a single-chamber machine will not sufficiently purify the air. I have therefore superimposed a second chamber on the first and in some instances a third chamber on the second. In order to form quiet spaces in which the dust could settle and down which it could slide without again being caught up by the air, I tried the plan of making, at any rate, the cylindrical portion of the machine corrugated, as shown and described in my application, Serial No. 370,302, filed November 4, 1890, wherein this idea is claimed. I find, however, that while this was on the whole effective the dust collected to too great an extent and fell down in lumps. These lumps were caught by the air in whole or in part and portions escaped. I have found, however, that if I form the cross-section of a polygonal shape instead of circular I form embayments just sufficient for most kinds of dust to collect in and to slide down without coming in contact with the whirling air, while at the same time no large amount can collect, but the dust comes down each angle in a constant stream. For smoke, however, I find it desirable to fix on each polygonal side one or more vertical strips K, hereinafter described under Fig. 5 of the drawings, so as to increase the number and size of the quiet angles in which the soot can collect and slide down. I have found from experience that a twelve-sided polygon is the best for this purpose for most sizes of machine. For very small sizes, however, I prefer a rather smaller number of sides, while for very large ones, indeed, the number of sides may be slightly increased with advantage.

Another great advantage in making the machines polygonal is that they can be made of flat boards or planks without extra cost.

The drawings herewith set forth the details of my invention.

Figure 2:
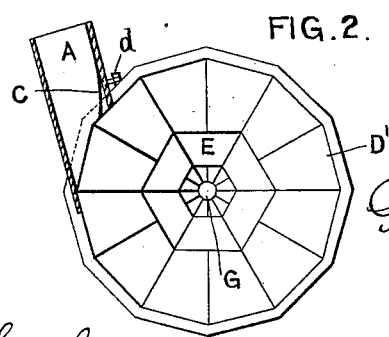
Figure 3:
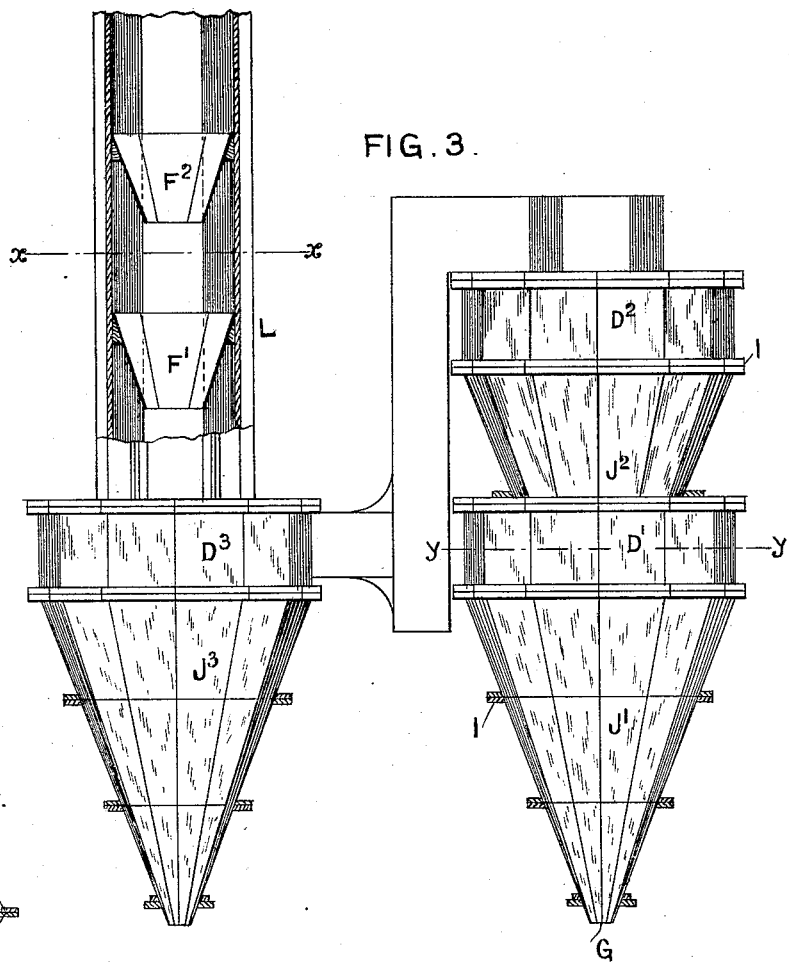
Figure 4:
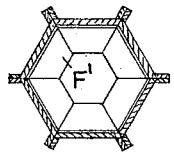
Figure 5:
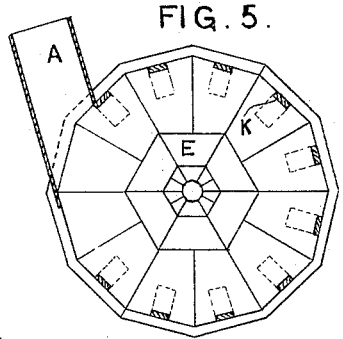
Figure 6:
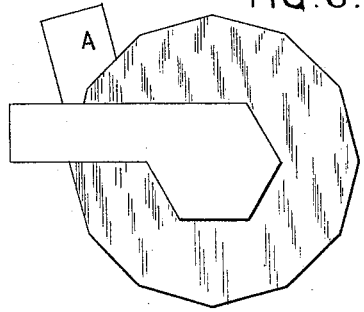

Figure 1 is a sectional elevation of an apparatus for separating fine dust from air; Fig. 2, a plan of same; Fig. 3, a modified arrangement where the available space in height will not allow of the form set forth in Fig. 1; Fig. 4, a sectional plan view through $xx$; Fig. 5, a modified section through $yy$ when the apparatus is used for smoke; Fig. 6, a plan of that part of Fig. 3 immediately above it.

Like letters relate to like parts in all the drawings.

In the drawings, A is the tangential entrance for the dusty air, B the exit for same, and C a sheet-iron regulating-plate attached to the inner side of the entrance-orifice. A small hand-hole is arranged in any convenient position with a suitable cover to enable the operator to bend this sheet-iron regulator by hand, as required, while the machine is at work, or it can be worked by set-screw $d$, as shown in Fig. 2. This regulating-plate is bent more toward the center of the machine when a larger amount of air has to be cleansed; but is bent backward the other way when the supply of air is reduced.

$D'$ $D^2$ $D^3$ are polygonal chambers with parallel sides, into the lowest of which, if there are more than one, the spout A enters.

E is a small cone entering the closed top of the upper chamber, if there be more than one, or the chamber $D'$, if there be only one, from which the purified air passes to the outside. A further exit-shaft is sometimes used, having further cones $F'$ $F^2$. These are, however, not necessary and in most cases can be dispensed with. They are useful, however, for chimneys.

G is a small opening at the bottom of hopper J', out of which the dust or soot escapes. A bag or other receiver can be placed at this point to receive the dust or soot; H, an orifice through which the air escapes out of chamber D' or D²; I, connecting-flanges of parts of hoppers J' J² J³; J' J² J³, pyramidal hoppers; K, strips fixed to sides of polygonal chambers D' D² D³ when smoke or very fine dust has to be extracted; L, a chimney. In some places there is not room enough to place the three chambers in a single vertical tier, and I therefore arrange them as shown in Fig. 3, upon reference to which it will be seen that the chamber D³ J³ is placed by the side of the chambers D' J' D² J², and is connected to the latter by a suitable trunk.

The mode of action is as follows: The air entering at A passes round the polygonal portion D'. The dust or soot by centrifugal force is driven outward, and finding quiescent places at each corner settles down in these corners and slides down the hopper J' to the exit G. The air escapes through opening H into the second cone J², and from it in a similar manner into the third, if there be one, and escapes finally into the atmosphere at B, Fig. 1, or E under F³, Fig. 3. The air entering the second cone J² has still a rotatory motion and continues to deposit what little dust it has in its corners and those of the prismatic portion above. The purified air escapes through central opening H and eventually into the atmosphere at B.

The entire machine is preferably made of boards nailed or screwed and glued together or of metal. It is preferably formed in a series of parts joined together by flanges at I I I in order to enable it to be more portable.

It has been found by actual tests that where there are three chambers placed one above the other, as shown, the air has a strong rotary motion in the uppermost chamber. It is also an established fact that some dust is collected in this top chamber, especially when it is used for separating smoke from air, which dust runs down the corners or angles in long narrow rolls or threads, which, as they fall from one chamber into the other, are instantly thrown out to the edge by centrifugal force, and do not seem to be interfered with at all by the rising air. I think that because of the polygonal shape of the inverted truncated pyramid the rotary air-current does not enter the corners or angles of the same at the mouth or entrance, and consequently the dust does not fall into the ascending air-current, but into the rotary air-current outside of the ascending current, where it is driven against the sides of the chamber. I do not intend to say definitely that this is the reason for the non-interference of the descending dust and the ascending air; but it is the best explanation that I am able to give at this time. It is sufficient to say that the separation is effected in all three chambers, and that the dust collected in the uppermost chambers falls down into the lower chambers through the same opening through which the air-current ascends.

I declare that what I claim is—

1. In a dust-collector, a polygonal portion D', having a tangential air-inlet and a top air-outlet and having a very obtuse angle at the junction of the sides or plates which form the polygon or polygonal chamber, in combination with a tapering discharge-chamber.

2. In a dust-collector, a polygonal portion D', having a tangential air-inlet and a top air-outlet, in combination with a tapering dust-discharge chamber, also polygonal in cross-section.

3. In combination with a tapering-chamber D' J', into which the air enters tangentially, a second tapering chamber extending down into the top of the first-mentioned chamber and having an outlet at the top, all substantially as shown and described, whereby the rotary action of the lower air-current is continued in the upper chamber and a further amount of dust separated by centrifugal force in the upper chamber and caused to descend into the lower chamber.

4. In combination with the polygonal tapering chamber D' J', having a tangential air-inlet and a top air-outlet, the second tapering chamber D² J², polygonal in cross-section, provided at its top with an air-outlet and having its lower portion J² extending down through the top of the lower chamber.

In testimony whereof I have signed my name to this specification in the presence of two subscribing witnesses.

P. VAN GELDER.

Witnesses:
WM. P. THOMPSON,
H. P. SHOOBRIDGE.